United States Patent [19]

Miller

[11] Patent Number: 5,675,718
[45] Date of Patent: Oct. 7, 1997

[54] METHOD AND APPARATUS FOR DYNAMIC FONT AVAILABILITY

[75] Inventor: Howard A. Miller, Saratoga, Calif.

[73] Assignee: Apple Computer, Inc., Cupertino, Calif.

[21] Appl. No.: 443,211

[22] Filed: May 17, 1995

[51] Int. Cl.[6] .............................. B41B 00/00; G06K 1/00; G06F 15/00; H04N 1/411
[52] U.S. Cl. ........................ 395/110; 395/110; 395/150; 395/112; 395/114; 395/116; 395/115; 358/261.4
[58] Field of Search ............................... 395/110, 150, 395/115, 116, 112, 114, 164, 165; 358/261.4

[56] References Cited

U.S. PATENT DOCUMENTS

| | | | |
|---|---|---|---|
| 5,041,994 | 8/1991 | Lahey et al. | 364/519 |
| 5,050,098 | 9/1991 | Brown, III et al. | 364/519 |
| 5,483,622 | 1/1996 | Zimmerman et al. | 395/114 |

*Primary Examiner*—Edward L. Coles, Sr.
*Assistant Examiner*—Mark Wallerson
*Attorney, Agent, or Firm*—Nancy R. Simon

[57] ABSTRACT

Unused space in a storage medium such as a read only memory is used to store additional fonts in an apparatus, thereby increasing the total number of fonts stored in the apparatus. The number of fonts made available to a user is based upon the amount of random access memory that is available for fonts. All or a portion of the fonts are made available to the user based on the amount of random access memory that is available for fonts. The number of available fonts can be increased by increasing the amount of random access memory.

14 Claims, 5 Drawing Sheets

Figure 2- Prior Art

METHOD AND APPARATUS FOR DYNAMIC FONT AVAILABILITY

BACKGROUND OF THE INVENTION

1. Field of the Invention

The present invention relates in general to output devices such as printers, and more particularly to font availability in output devices. Still more particularly, the present invention relates to a method and apparatus for dynamic font availability.

2. Description of the Prior Art

Random access memory (RAM) in a printer is typically comprised of a page buffer, the operating system, and a font cache. A page buffer is used to store a page that is to be printed. A font cache is a portion of RAM that is available for fonts, and is used to store information about fonts. Included in the information the font cache stores is information about the font that is currently being used.

In some printers, such as low cost printers, the total amount of RAM is minimized in order to keep costs down. Most of that limited RAM is allocated for the page buffer. The remaining RAM is allocated to the operating system and the font cache. Limiting the size of the font cache affects the number of fonts that can be used by the printer. Because the size of the font cache determines the number of fonts that can be used, low cost printers contain only the number of fonts that will be available to a user when the printer is in operation. In other words, only the number of fonts that can be used based upon the size of the font cache are stored in the printer. This means a printer may contain a subset of the total number of commercially available fonts.

If a user wants to have access to a greater number of fonts, he or she has two options. First, the user can purchase a printer with a larger amount of RAM and with a greater number of available fonts. In printers, fonts are typically stored in a read only memory (ROM). Thus, in order to get more fonts, a larger amount of ROM is used in the printer. Increasing both the amount of RAM and ROM in the printer, however, makes the printer more expensive due to the high cost of memory.

The second option is to purchase a printer with a reduced number of fonts, and then purchase additional RAM plus additional fonts. Increasing the amount of RAM in the printer will increase the size of the font cache. This means that the printer can use a greater number of fonts.

Next, the user needs to add the additional fonts to the printer. Increasing the number of fonts the printer can use can be done in several ways. One way is to purchase a font cartridge. A font cartridge has additional fonts stored in a ROM within the cartridge. This font cartridge is inserted into a cartridge port in the printer. Once the font cartridge and additional RAM are installed, the user has access to the additional fonts.

A second way to increase the number of fonts is to purchase software containing fonts that can be downloaded into the font cache. In order to download the additional fonts into the font cache, the user must have installed the additional RAM so that the font cache is larger and can store the additional fonts.

From a user's perspective, both options are undesirable because they require the user to pay more to own and operate a printer. The first option of purchasing a printer with an increased amount of RAM and ROM is expensive due to the cost of memory. The second option is more costly for the user because he or she must purchase the additional RAM plus the additional fonts.

Therefore, increasing the number of available fonts in an output device such as a printer in an efficient and cost effective manner is desirable.

SUMMARY OF THE INVENTION

Unused space in a storage medium such as a read only memory is used to store additional fonts in an apparatus, thereby increasing the total number of fonts stored in the apparatus. The number of fonts made available to a user is based upon the amount of random access memory that is available for fonts. All or a portion of the fonts are made available to the user based on the amount of random access memory that is available for fonts. The number of available fonts can be increased by increasing the amount of random access memory.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
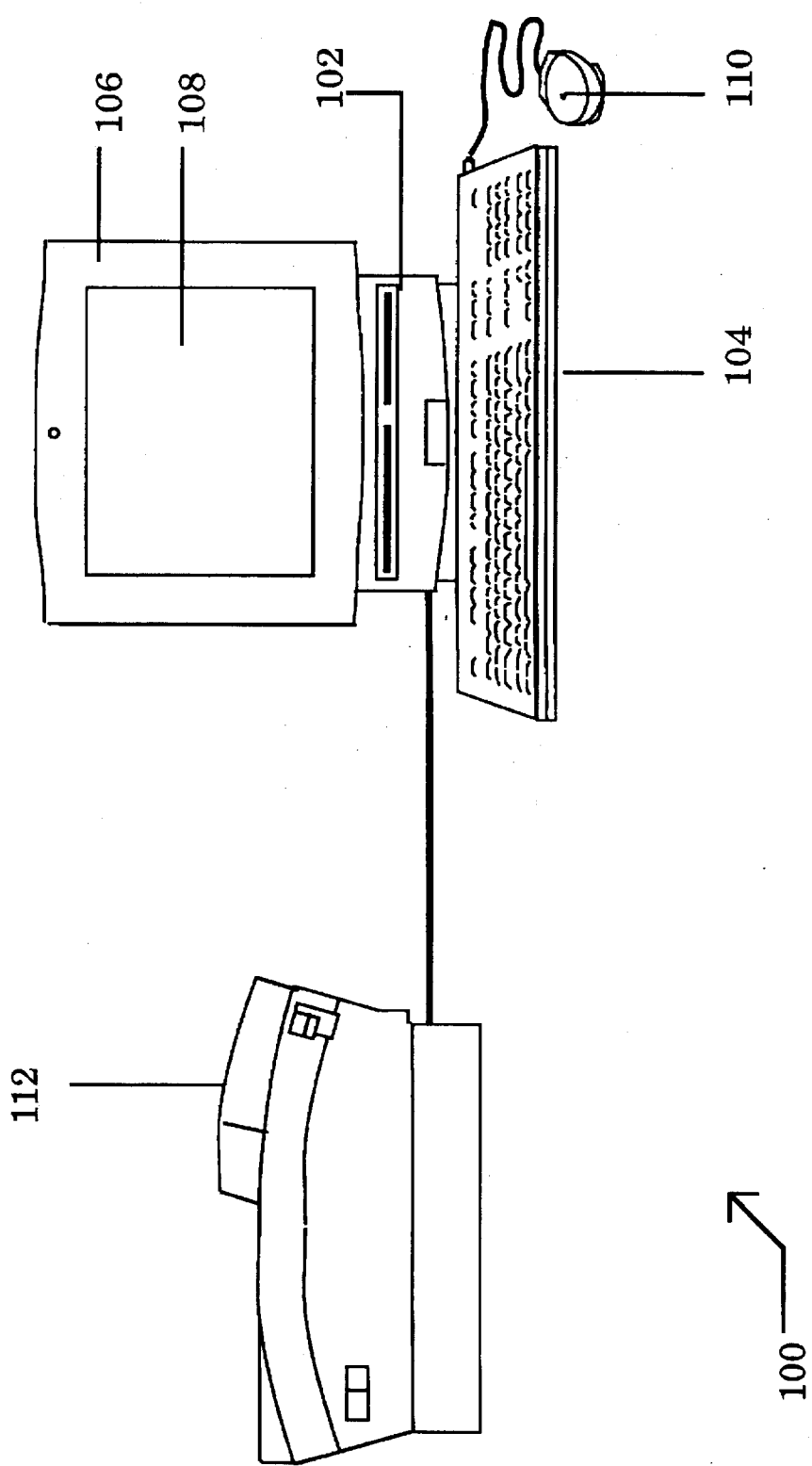
FIG. 1 illustrates a preferred system that may be used to implement the method and apparatus for dynamic font availability according to the present invention.

With reference now to the figures and in particular with reference to FIG. 1, a preferred system is illustrated that may be used to implement the method and apparatus for dynamic font availability according to the present invention. Computer system 100 includes a computer 102, keyboard 104, a monitor 106 having a display screen 108, a cursor control device 110, shown here as a mouse, and a printer 112. Computer system 100 may be implemented using any suitable computer and printer, such as a Macintosh Performa® computer and a Color LaserWriter® 12/600 PS, both products of Apple Computer, Incorporated, located in Cupertino, Calif.

Figure 2:
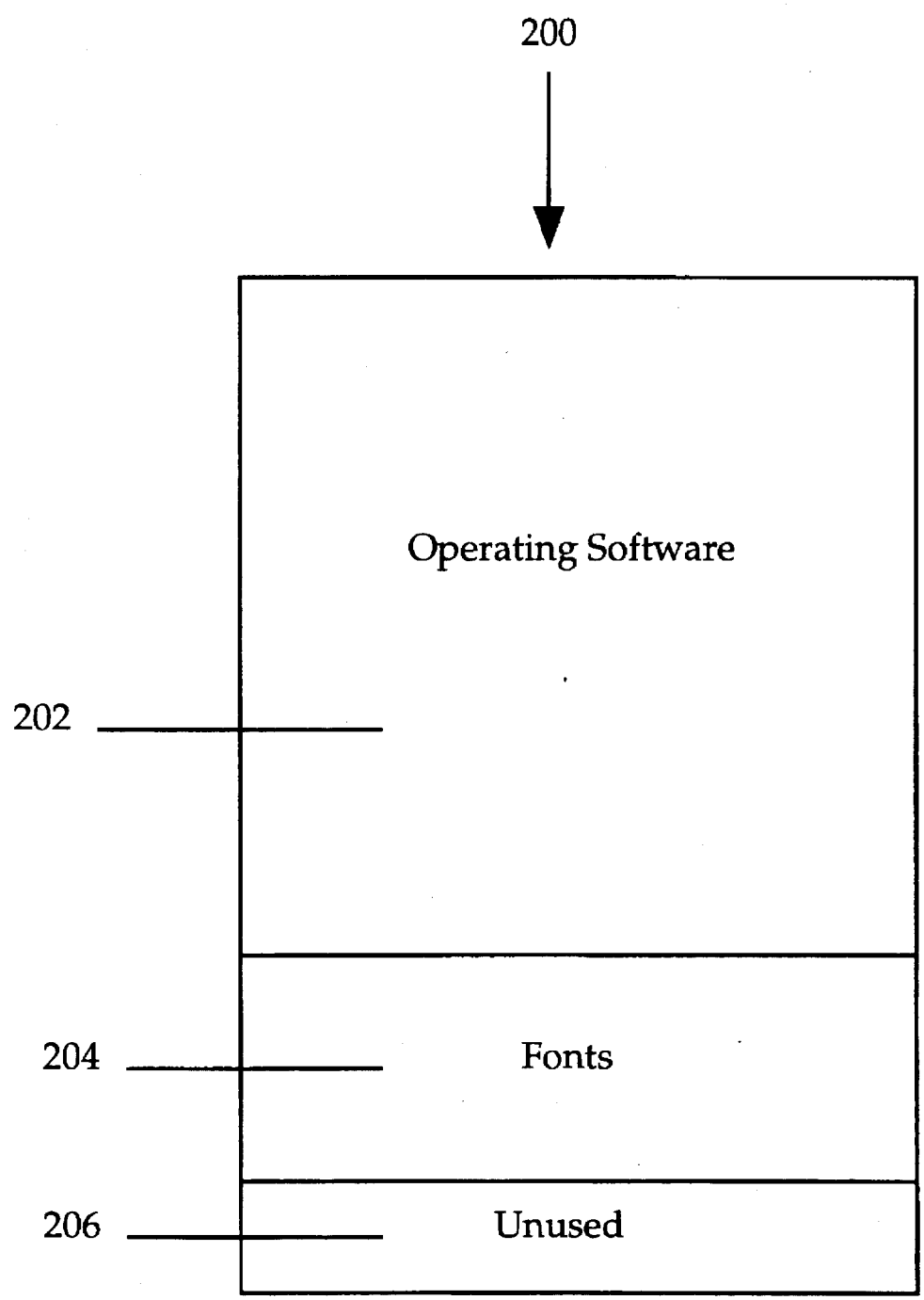
FIG. 2 is a pictorial representation of a read-only memory (ROM) according to the prior art.

FIG. 2 is a pictorial representation of a read-only memory (ROM) according to the prior art. ROM 200 may be a single ROM or a set of ROMs. ROM 200 is comprised of operating software 202, fonts 204, and unused memory 206. Operating software 202 includes such items as an operating system, device drivers, and page description languages such as Postscript® or PCL™. Fonts 204 are fonts stored in ROM 200 by the printer manufacturer, so that when the printer is purchased by a user, all of the fonts that can be used are included with the printer.

Typically ROM is assembled in a manner that results in the total amount of ROM being a factor of two, i.e. two megabytes, four megabytes, eight megabytes, or more. This factor of two construction is generally due to the cost of memory and the way memory is organized. But assembling ROM in this manner can result in a portion of the ROM not being used. For example, an apparatus that needs five megabytes of ROM may in actuality have six or eight megabytes of installed ROM. Thus, the apparatus will have one to three megabytes of unused ROM. The present invention utilizes this unused memory for storing additional fonts in an output device such as a printer. In the preferred embodiment, the number of fonts a user has access to is based upon the size of the font cache in random access memory.

Figure 3:
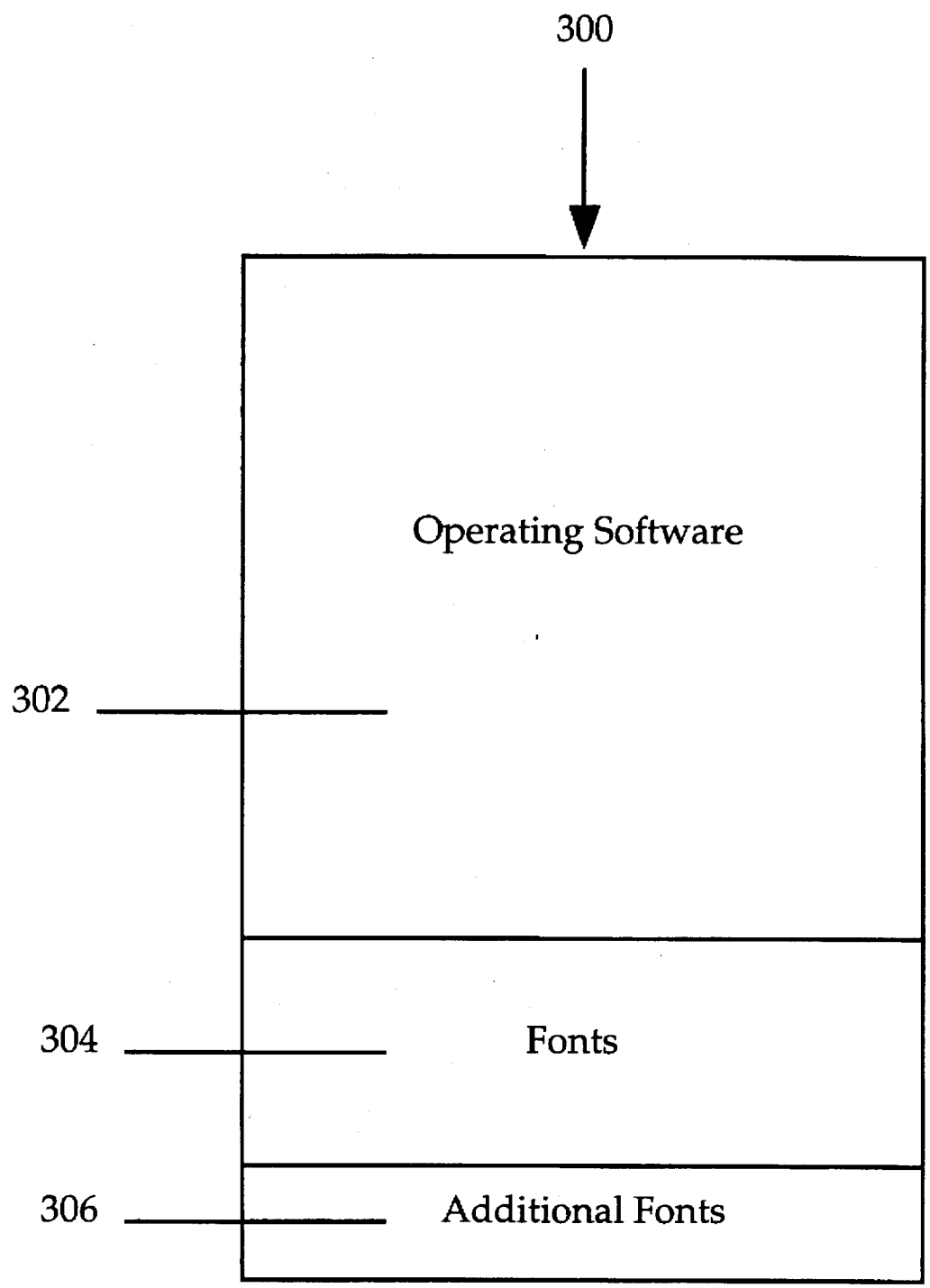
FIG. 3 is a pictorial representation of a read-only memory (ROM) that may be used to implement the method and apparatus for dynamic font availability according to the present invention.

FIG. 3 is a pictorial representation of a read-only memory (ROM) that may be used to implement the method and apparatus for dynamic font availability according to the present invention. ROM 300 may be a single ROM or a set of ROMs, and is preferably located in a printer. ROM 300 is comprised of operating software 302, fonts 304, and additional fonts 306. Operating software 302 preferably includes such items as an operating system, device drivers, and page description languages such as Postscript® or PCL™.

Additional fonts 306 are stored in what would have been unused space within ROM 300. Fonts 304 and additional fonts 306 are preferably stored by the printer manufacturer, so that when the printer is purchased by a user the fonts are included with the printer. Fonts 304 and additional fonts 306 are stored in the ROM in a manner that eliminates or minimizes the amount of unused space in the ROM. Thus, the total number of fonts in the printer is increased without any additional hardware.

Figure 4:
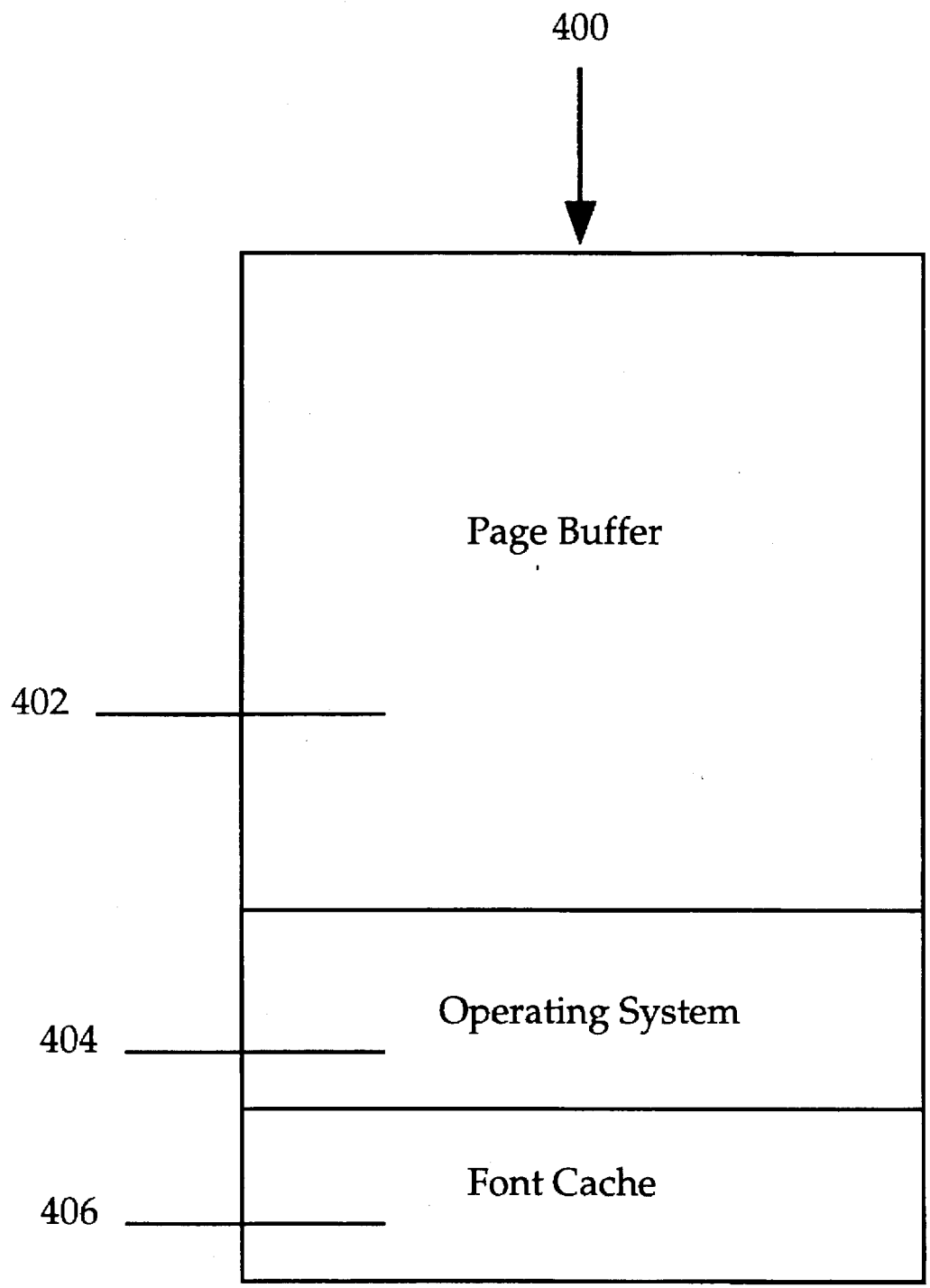
FIG. 4 is a pictorial representation of a random access memory (RAM) that may be used to implement the method and apparatus for dynamic font availability according to the present invention.

FIG. 4 is a pictorial representation of a random access memory (RAM) that may be used to implement the method and apparatus for dynamic font availability according to the present invention. RAM 400 is preferably located in a printer, and is comprised of a page buffer 302, operating system 304, and font cache 306. Page buffer 302 is used to store a page that is to be printed. The page can be stored as a bit for bit image or in compressed bands. Font cache 306 is a portion of RAM 400 that is available for fonts, and is used to store information about fonts. Included in the information the font cache stores is information about the font that is currently being used.

The size of font cache 306 determines the number of fonts that are available in the printer. If only a portion of the fonts stored in ROM are made available initially, only the amount of RAM needs to increase in order to increase the number of available fonts. Increasing the amount of RAM will increase the size of font cache 306. Thus, the present invention provides a method and apparatus for dynamic font availability. The number of available fonts increases or decreases dynamically based upon the size of the font cache in RAM.

Figure 5:
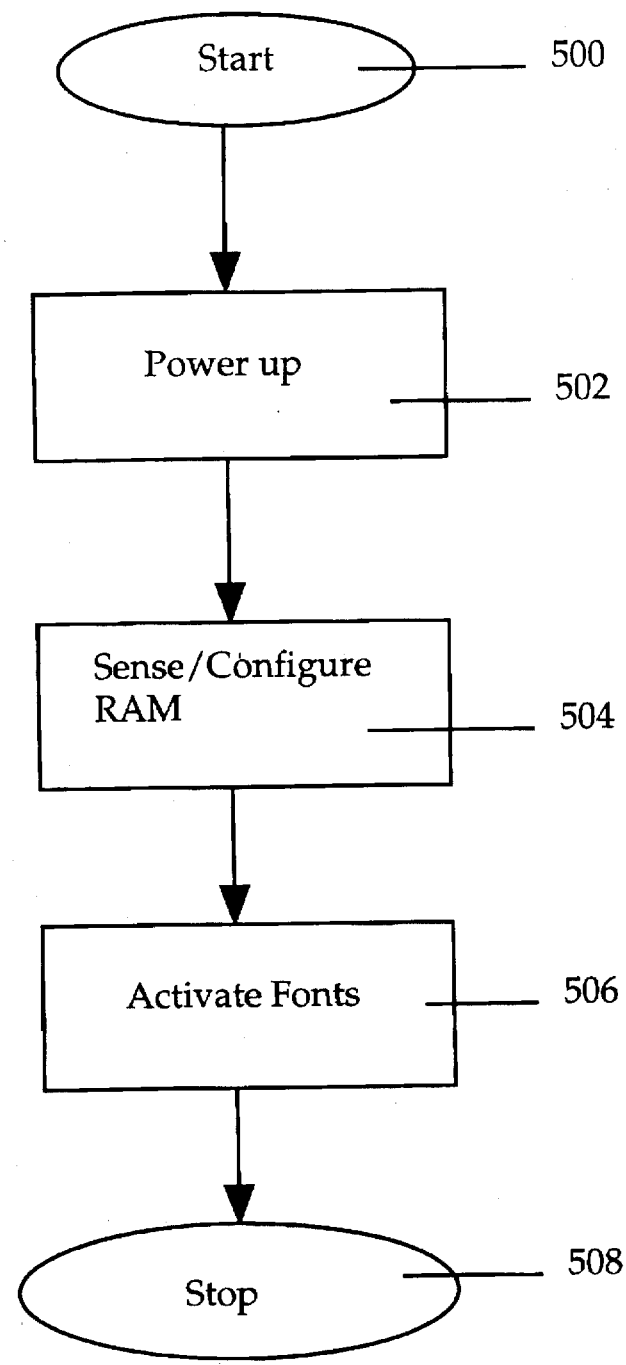
FIG. 5 is a flowchart depicting a preferred method for dynamic font availability according to the present invention.

Referring to FIG. 5, a flowchart depicts a preferred method for dynamic font availability according to the present invention. The method begins at block 500, with all fonts stored in ROM within the printer. The fonts are stored in the ROM in a manner that eliminates or minimizes the amount of unused space in the ROM.

Next, a user turns on the printer, as shown in block 502. Initially the amount of RAM is determined and configured using methods known in the art. This step is illustrated in block 504. A portion of the RAM will be used for the page buffer and operating system. The remaining RAM is used as a font cache to store information about the fonts. Based upon the size of the font cache, a particular number of fonts are made available for the user, as shown in block 506. The process then ends, as shown in block 508.

Determining the number of fonts that can be stored in the font cache is known in the art. For example, one method to determine how many fonts can be stored in the font cache is to store fonts in the font cache until an overflow or error condition occurs. Those skilled in the art will recognize that other techniques known in the art can be used to determine the amount of RAM that is available for fonts.

If the font cache is large enough, all the fonts stored in the ROM can be made available to the user. If only a portion of the fonts will be made available to the user, which fonts are made available can be determined several ways. One method is to make the more commonly used fonts available to the user. Another option is to determine which fonts are more desirable in the country and/or market in which the printer is sold. This method allows a printer manufacturer to personalize a printer for each country and/or market, thereby increasing the marketability of the printer. Alternatively, the user can select which fonts he or she wants via a dialog box or menu.

One of the advantages to the present invention is that is that the number of fonts can be changed dynamically as the size of the font cache changes. As the size of the font cache increases, additional fonts are automatically made available. Another advantage is that a larger number of fonts can be made available to a user for less cost. By storing the additional fonts in the unused space in the ROM, a printer manufacturer does not have to purchase and use additional ROM in order to offer a greater number of fonts on a printer. Since the use of existing memory is more efficient, the cost to manufacture the printer is reduced. Lowering the manufacturing costs results in a lower purchase price for the printer.

While the invention has been particularly shown and described with reference to a preferred embodiment, it will be understood by those skilled in the art that various changes in form and detail may be made therein without departing from the spirit and scope of the invention. For example, the present invention is not limited to using read only memory to store the additional fonts. Any storage medium having unused space can be used. Furthermore, the present invention can be implemented in devices other than printers, such as pre-press machines.

What is claimed is:

1. A method for dynamically making fonts available to a system, comprising the steps of:

storing a collection of fonts in a first storage medium, wherein the collection of fonts is comprised of a plurality of fonts and at least one additional font, and wherein the at least one additional font is stored in the first storage medium in a manner that minimizes or eliminates an amount of unused space in the first storage medium;

determining an amount of space available for fonts in a second storage medium in the system; and automatically making one or more fonts in the collection of fonts stored in the first storage medium available to the system based upon the amount of space that is available for fonts in the second storage medium.

2. The method of claim 1, wherein the step of determining the amount of space in the second storage medium that is available for fonts is performed when the system is first turned on and is undergoing initial configuration.

3. The method of claim 1, wherein the first storage medium comprises a read only memory.

4. The method of claim 1, wherein the system comprises a printer.

5. A method for dynamically making fonts available to a system having a first storage medium and a collection of fonts stored in a second storage medium, wherein the collection of fonts is comprised of a plurality of fonts and at least one additional font, and wherein the at least one additional font is stored in the second storage medium in a manner that minimizes or eliminates an amount of unused space in the second storage medium, the method comprising the steps of:

determining an amount of space available for fonts in the first storage medium; and automatically making one or more fonts in the collection of fonts stored in the second storage medium available to the system based upon the amount of space that is available for fonts in the first storage medium.

6. The method of claim 5, wherein the step of determining the amount of space available for fonts in the first storage medium is performed when the system is first turned on and is undergoing initial configuration.

7. The method of claim 5, wherein the second storage medium comprises a read only memory.

8. The method of claim 5, wherein the system comprises a printer.

9. A system for dynamic font availability, comprising:

a first storage medium comprised of a collection of fonts stored therein, wherein the collection of fonts is comprised of a plurality of fonts and at least one additional font wherein the at least one additional font is stored in the first storage medium in a manner that minimizes or eliminates an amount of unused space in the first storage medium;

a second storage medium, wherein at least a portion of the second storage medium is available for fonts; and means for automatically making one or more fonts in the collection of fonts stored in the first storage medium available to the system based upon the amount of space that is available for fonts in the second storage medium.

10. The system of claim 9, wherein the system comprises a printer.

11. The system of claim 9, wherein the first storage medium comprises a read only memory.

12. The method of claim 1, wherein the second storage medium comprises a random access memory.

13. The method of claim 5, wherein the first storage medium comprises a random access memory.

14. The system of claim 9, wherein the second storage medium comprises a random access memory.

* * * * *